United States Patent
Deutsch et al.

(10) Patent No.: US 10,592,788 B2
(45) Date of Patent: Mar. 17, 2020

(54) ZERO-SHOT LEARNING USING MULTI-SCALE MANIFOLD ALIGNMENT

(71) Applicant: HRL Laboratories, LLC, Malibu, CA (US)

(72) Inventors: Shay Deutsch, Los Angeles, CA (US); Kyungnam Kim, Oak Park, CA (US); Yuri Owechko, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 37 days.

(21) Appl. No.: 15/847,895

(22) Filed: Dec. 19, 2017

(65) Prior Publication Data

US 2018/0197050 A1    Jul. 12, 2018

Related U.S. Application Data

(60) Provisional application No. 62/440,898, filed on Dec. 30, 2016.

(51) Int. Cl.
  *G06K 9/62* (2006.01)
  *G06K 9/72* (2006.01)

(52) U.S. Cl.
  CPC ........... *G06K 9/726* (2013.01); *G06K 9/6224* (2013.01)

(58) Field of Classification Search
  CPC .............................. G06K 9/726; G06K 9/6224
  See application file for complete search history.

(56) References Cited

U.S. PATENT DOCUMENTS

| 8,437,558 | B1 | 5/2013 | Medasani et al. | |
|---|---|---|---|---|
| 9,489,732 | B1 | 11/2016 | Khosla et al. | |
| 2007/0183670 | A1* | 8/2007 | Owechko | G06K 9/00369 382/224 |
| 2011/0057946 | A1* | 3/2011 | Yamamoto | G06K 9/00134 345/589 |
| 2014/0086497 | A1* | 3/2014 | Fei-Fei | G06K 9/00369 382/224 |
| 2014/0376804 | A1* | 12/2014 | Akata | G06K 9/4676 382/159 |
| 2015/0055854 | A1* | 2/2015 | Marchesotti | G06K 9/627 382/159 |

(Continued)

OTHER PUBLICATIONS

Defferrard et al. "Convolutional Neural Networks on Graphs with Fast Localized Spectral Filtering", 2016, NIPS proceedings (Year: 2016).*

(Continued)

*Primary Examiner* — Qian Yang
(74) *Attorney, Agent, or Firm* — Tope-McKay & Associates

(57) ABSTRACT

Described is a system for recognition of unseen and untrained patterns. A graph is generated based on visual features from input data, the input data including labeled instances and unseen instances. Semantic representations of the input data are assigned as graph signals based on the visual features. The semantic representations are aligned with visual representations of the input data using a regularization method applied directly in a spectral graph wavelets (SGW) domain. The semantic representations are then used to generate labels for the unseen instances. The unseen instances may represent unknown conditions for an autonomous vehicle.

23 Claims, 11 Drawing Sheets

(56) References Cited

U.S. PATENT DOCUMENTS

| | | | |
|---|---|---|---|
| 2015/0310862 A1 | 10/2015 | Dauphin et al. | |
| 2015/0334269 A1* | 11/2015 | Yokota | H04N 5/232 382/103 |
| 2016/0379076 A1* | 12/2016 | Nobuoka | G06K 9/46 382/103 |

OTHER PUBLICATIONS

Hammond, D.K., Vandergheynst, P. and Gribonval, R. Wavelets on graphs via spectral graph theory. Applied and Computational Harmonic Analysis, 30(2), pp. 129-150, 2011.

Changpinyo, S., Chao, W., Gong, B., and Sha, F. Synthesized Classifiers for Zero-Shot Learning. Proceedings of the IEEE Conference on Computer Vision and Pattern Recognition (CVPR), Las Vegas, NV, 2016, pp. 5327-5336.

Fu, Y., Hospedales, T.M., Xiang, T. and Gong, S. Transductive multi-view zero-shot learning. IEEE transactions on pattern analysis and machine intelligence, 37(11), pp. 2332-2345, 2015.

Mikolov, T., Sutskever, I., Chen, K., Corrado, G.S., and Dean, J. Distributed Representations of Words and Phrases and their Compositionality, Advances in Neural Information Processing Systems, 2013, pp. 1-9.

Lampert, C.H., Nickisch, H. and Harmeling, S. Attribute-based classification for zero-shot visual object categorization. IEEE Transactions on Pattern Analysis and Machine Intelligence, 36(3), pp. 453-465, 2014.

Qiao, R., Liu, L., Shen, C., and van den Hengel, A. Less is More: Zero-Shot Learning from Online Textual Documents with Noise Suppression. Proceedings of the IEEE Conference on Computer Vision and Pattern Recognition (CVPR), Las Vegas, NV, Jun. 2016, pp. 2249-2257.

Shuman, D.I., Narang, S.K., Frossard, P., Ortega, A. and Vandergheynst, P. The emerging field of signal processing on graphs: Extending high-dimensional data analysis to networks and other irregular domains. IEEE Signal Processing Magazine, 30(3), pp. 83-98, 2013.

Deutsch, S., and Ortega, A., and Medioni, G. Manifold Denoising Based on Spectral Graph Wavelets, International Conference on Acoustics, Speech and Signal Processing, 2016, pp. 4673-4677.

Hein, M. and Maier, M. Manifold Denoising, Advances in Neural Information Processing Systems, 2006, pp. 1-9.

Xian, Y., Akata, Z., Sharma, G., Nguyen, Q., Hein, M. and Schiele, B. Latent Embeddings for Zero-shot Classification. arXiv preprint arXiv:1603.08895, 2016, pp. 1-14.

Zhang, Z. and Saligrama, V. Zero-shot learning via semantic similarity embedding. In Proceedings of the IEEE International Conference on Computer Vision, pp. 4166-4174, 2015.

Ng, A.Y., Jordan, M.I. and Weiss, Y. On spectral clustering: Analysis and an algorithm. Advances in neural information processing systems, 2, pp. 849-856, 2002.

B. J. Frey and D. Dueck. Clustering by passing messages between data points. Science, 315:2007, 2007, pp. 972-976.

C. H. Lampert, H. Nickisch, and S. Harmeling. Learning to detect unseen object classes by between class attribute transfer. In IEEE Conference on Computer Vision and Pattern Recognition (CVPR), 2009, pp. 951-958.

B. Romera-Paredes and P. H. Torr. An embarrassingly simple approach to zero-shot learning. Proceedings of the 32nd International Conference on Machine Learning (ICML), 2015, pp. 1-10.

E. Kodirov, T. Xiang, Z.-Y. Fu, and S. Gong. Unsupervised domain adaptation for zero-shot learning. In ICCV, 2015, pp. 2452-2460.

Z. Akata, S. Reed, D. Walter, H. Lee, and B. Schiele. Evaluation of output embeddings for fine-grained image classification. In IEEE Computer Vision and Pattern Recognition, 2015, pp. 2927-2936.

S. T. Roweis, L. K. Saul, and G. E. Hinton. Global coordination of local linear models. In Advances in Neural Information Processing Systems, Dec. 3-8, 2001, Vancouver, British Columbia, Canada, pp. 1-8.

Notification of Transmittal of International Search Report and the Written Opinion of the International Searching Authority for PCT/US2017/067447; dated Apr. 13, 2018.

International Search Report of the International Searching Authority for PCT/US2017/067447; dated Apr. 13, 2018.

Written Opinion of the International Searching Authority for PCT/US2017/067447; dated Apr. 13, 2018.

Notification of International Preliminary Report on Patentability for PCT/US2017/067447; dated Jul. 11, 2019.

International Preliminary Report on Patentability for PCT/US2017/067447; dated Jul. 11, 2019.

* cited by examiner

| Method/Data | word2vec semantic space |
|---|---|
| word2vec | 36% |
| Regularized semantic word2vec | 80% |

FIG. 5

| Method/Data | AWA |
|---|---|
| DAP (A); Lit. Ref. No. 14 | 57.5% |
| EZSL (A); Lit. Ref. No. 15 | 62.85% |
| UDA (A); Lit. Ref. No. 16 | 73.2% |
| UDA (A+ W); Lit. Ref. No. 16 | 75.6% |
| Less is more (W); Lit. Ref. No. 6 | 64.46% |
| Semantic Embedding (A); Lit. Ref. No. 11 | 76.33% |
| LatEm (A); Lit. Ref. No. 10 | 72.5% |
| LatEm (W); Lit. Ref. No. 10 | 52.3% |
| SJE (W); Lit. Ref. No. 17 | 51.2% |
| SJE (A,real); Lit. Ref. No. 17 | 66.7% |
| TZSL (W); Lit. Ref. No. 3 | 67% |
| Invention (W); Lit. Ref. No. 12 based classification | 80% |
| Invention (W); AP classification, Lit. Ref. No. 18 | 81.3% |

FIG. 6

ZERO-SHOT LEARNING USING MULTI-SCALE MANIFOLD ALIGNMENT

CROSS-REFERENCE TO RELATED APPLICATIONS

This is a Non-Provisional application of U.S. Provisional Patent Application No. 62/440,898, filed Dec. 30, 2016, entitled, "Zero-Shot Learning Using Multi-Scale Manifold Alignment", the entirety of which is incorporated herein by reference.

BACKGROUND OF INVENTION

(1) Field of Invention

The present invention relates to a system for recognition of unseen and untrained patterns and, more particularly, to a system for recognition of unseen and untrained patterns using a localized multi-scale graph transform for manifold alignment.

(2) Description of Related Art

Zero-shot learning is being able to solve a task despite not having received any training examples of that task. Zero shot learning enables recognition of unseen or untrained patterns (e.g., objects in an image or video) with no training by utilizing semantic attribute descriptions of the patterns. This is useful for many applications, including enabling autonomous platforms to continue to operate in new situations that they have never before experienced. Recent work in zero shot learning has explored ways to suppress noise from automatically generated textual data, an approach that holds greater promise for real-world applications compared to human annotated attributes. However, these methods suffer from two main limitations. First, the correlation process between the visual and semantic features is decoupled into a few independent steps that require separate optimizations, and second, most of these approaches rely on k nearest neighbor parameter selection on the graph, which can be very sensitive to noise.

Attribute based classification was suggested for zero shot learning by incorporating semantic attributes on the top of low level features as an intermediate layer in order to learn and classify new classes which are disjoint from the training data. There are two types of semantic representations, which are used in zero shot learning approaches: (i) Human annotated attributes, and (ii) automated semantic attributes. The human annotated attributes are typically manually defined where each instance from the same class has the same attribute. The semantic information is the word2vec dataset representation, generated using the skip-gram neural network model (see Literature Reference No. 4 in the List of Incorporated Literature References) trained on English Wikipedia articles, where the textual name of any class was projected to get its word vector representation.

The early methods in zero shot learning, starting from Literature Reference No. 5, used human annotated attributes. More recent approaches have addressed the limitation of human annotation for practical applications in order to advance to a fully automated attributes-based system. Using semantic representations, which are automatically generated, is clearly advantageous from a practical aspect, however such automated semantic features are typically very noisy. Literature Reference No. 3 proposed a multi-view transductive setting, through multi-view alignment process using multi-view Canonical Correlation analysis. Another approach is described in Literature Reference No. 6, which was proposed to suppress noise from textual data using a $l_{2,1}$ based objective function. However, even when using deep learning features, the performance of all the methods described above is limited.

Thus, a continuing need exists for a system for learning the correlation between visual and semantic attributes as a single process that is able to suppress noise.

SUMMARY OF INVENTION

The present invention relates to system for recognition of unseen and untrained patterns and, more particularly, to a system for recognition of unseen and untrained patterns using a localized multi-scale graph transform for manifold alignment. The system comprises one or more processors and a non-transitory computer-readable medium having executable instructions encoded thereon such that when executed, the one or more processors perform multiple operations. The system generates a graph based on a set of visual features from input data, the input data comprising labeled instances and unseen instances that are unlabeled. Semantic representations of the input data are assigned as graph signals based on the set of visual features, wherein each semantic representation comprises coordinate dimensions. The semantic representations are aligned with visual representations of the input data using a regularization method applied directly in a spectral graph wavelets (SGW) domain. The semantic representations are used to generate labels for the unseen instances.

In another aspect, the system generates the graph such that labeled instances and unseen instances are represented by nodes in the graph, and weighted edges between the nodes are based on distances between visual features. The input data are assigned to the graph in the form of graph signals corresponding to attributes of the labeled instances and unseen instances. The visual and semantic representations are aligned by imposing smoothness in each coordinate dimension of the semantic representation.

In another aspect, for labeled instances $S=\{X_s, Y_s\}$ and target classes with unseen instances $T=\{X_t, \tilde{Y}_t\}$, k, the system generates the graph based on the visual features $X_s$, $X_t$; generates a Laplacian L from the graph; assigns a set of corresponding coordinate values of the semantic representation in a dimension r, $\tilde{f}_r = (\tilde{Y}_t)_r$ to a corresponding vertex on the graph; computes the SGW transform of $\tilde{f}_r$ to obtain a SGW domain $\Psi_{\tilde{f}_r}$ and applies a regularization method to $\tilde{f}_r$ directly in the SGW domain $\Psi_{\tilde{f}_r}$ using the regularization method.

In another aspect, the regularization method receives as input the semantic representation in the dimension r, $\tilde{f}_r = (\tilde{Y}_t)_r$, its corresponding SGW coefficients $\tilde{\Psi}_{\tilde{f}_r}$, the Laplacian L, a smoothing parameter γ, and a number of resolutions used for wavelet decompositions J, and for each resolution $2 \leq j \leq J$, the system generates a Laplacian $L_{\mathcal{N}(K)}$; determines a Tichonov regularization with respect to the Laplacian $L_{\mathcal{N}(K)}$ and SGW coefficients $\Psi_{\tilde{f}_r}(s)$; classifies the unseen instances using spectral clustering; and outputs a regularized semantic space $\hat{Y}_t$ and estimated target classes.

In another aspect, the unseen instances represent new environmental conditions for an autonomous vehicle to navigate, wherein estimating labels for the unseen instances enables the autonomous vehicle to operate effectively outside known environmental conditions.

In another aspect, the unseen instances represent new areas for an autonomous vehicle to navigate, wherein estimating labels for the unseen instances enables the autonomous vehicle to operate effectively outside known areas.

In another aspect, an unmanned aerial vehicle (UAV) uses the estimated labels for the unseen instances to identify at least one of objects and behaviors during UAV operations.

In another aspect, in generating the labels the system associates at least one unseen instance with a new traffic sign and causing an associated vehicle to perform a driving operation according to the new traffic sign.

In another aspect, the device is a vehicle component, and controlling the device results in a vehicle maneuver.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 5 is a table illustrating classification accuracy of word2Vec before and after regularization according to some embodiments of the present disclosure;

FIG. 6 is a table illustrating classification accuracy results, comparing state-of-the-art methods to the system according to some embodiments of the present disclosure;

DETAILED DESCRIPTION

Figure 1:
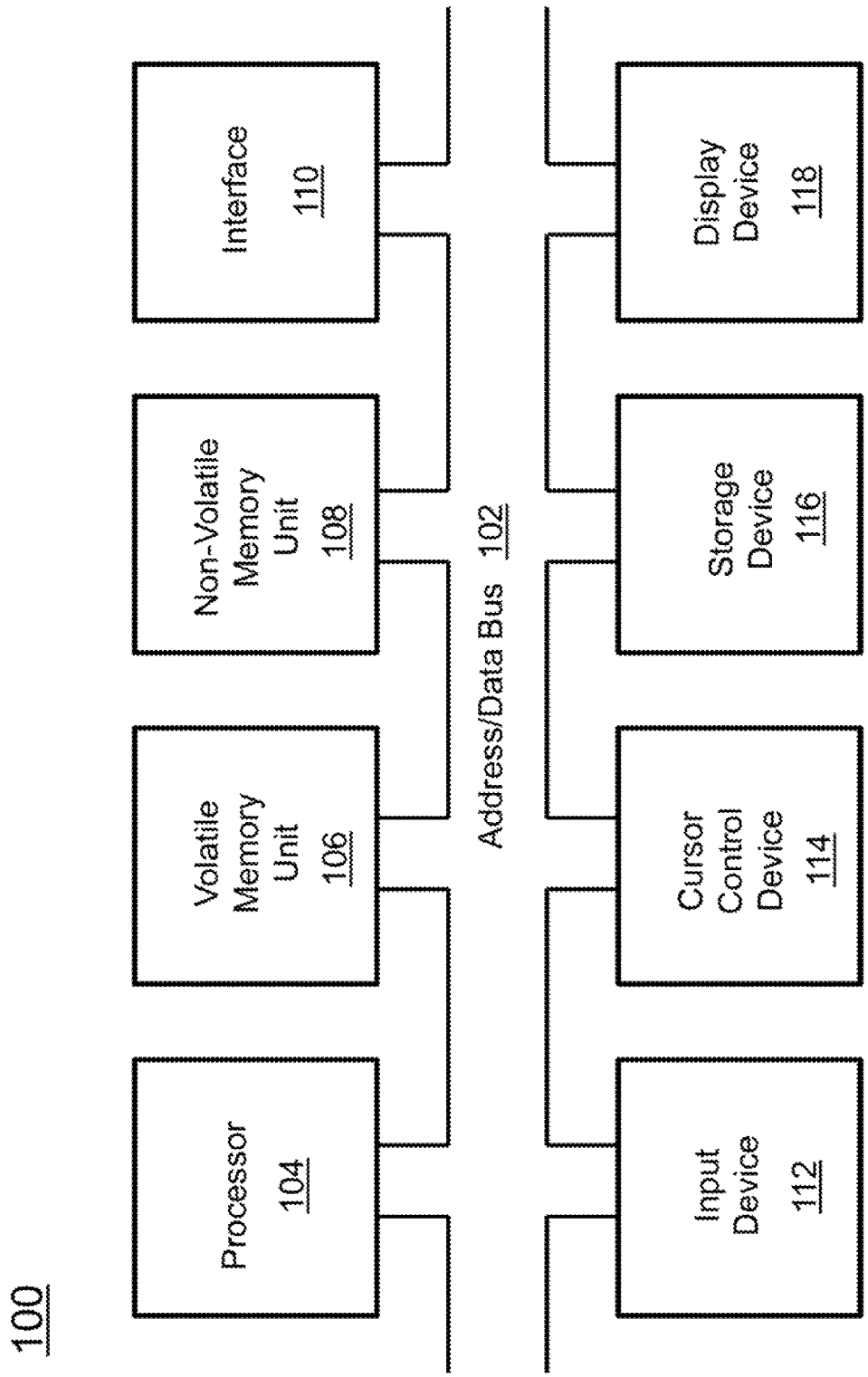
FIG. 1 is a block diagram depicting the components of a system for recognition of unseen and untrained patterns according to some embodiments of the present disclosure.

The present invention relates to a system for recognition of unseen and untrained patterns and, more particularly, to a system for recognition of unseen and untrained patterns using a localized multi-scale graph transform for manifold alignment. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) LIST OF INCORPORATED LITERATURE REFERENCES

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number.

1. Hammond, D. K., Vandergheynst, P. and Gribonval, R. Wavelets on graphs via spectral graph theory. Applied and Computational Harmonic Analysis, 30(2), pp. 129-150, 2011.
2. Changpinyo, S., Chao, W., Gong, B., and Sha, F. Synthesized Classifiers for Zero-Shot Learning. Proceedings of the IEEE Conference on Computer Vision and Pattern Recognition (CVPR), Las Vegas, Nev., 2016.
3. Fu, Y., Hospedales, T. M., Xiang, T. and Gong, S. Transductive multi-view zero-shot learning. IEEE transactions on pattern analysis and machine intelligence, 37(11), pp. 2332-2345, 2015.

4. Mikolov, T., Sutskever, I., Chen, K., Corrado, G. S., and Dean, J. Distributed Representations of Words and Phrases and their Compositionality, Advances in Neural Information Processing Systems, 2013.
5. Lampert, C. H., Nickisch, H. and Harmeling, S. Attribute-based classification for zero-shot visual object categorization. IEEE Transactions on Pattern Analysis and Machine Intelligence, 36(3), pp. 453-465, 2014.
6. Qiao, R., Liu, L., Shen, C., and van den Hengel, A. Less is More: Zero-Shot Learning from Online Textual Documents with Noise Suppression. Proceedings of the IEEE Conference on Computer Vision and Pattern Recognition (CVPR), Las Vegas, Nev., June 2016.
7. Shuman, D. I., Narang, S. K., Frossard, P., Ortega, A. and Vandergheynst, P. The emerging field of signal processing on graphs: Extending high-dimensional data analysis to networks and other irregular domains. IEEE Signal Processing Magazine, 30(3), pp. 83-98, 2013.
8. Deutsch, S., and Ortega, A., and Medioni, G. Manifold Denoising Based on Spectral Graph Wavelets, International Conference on Acoustics, Speech and Signal Processing, 2016.
9. Hein, M. and Maier, M. Manifold Denoising, Advances in Neural Information Processing Systems, 2006.
10. Xian, Y., Akata, Z., Sharma, G., Nguyen, Q., Hein, M. and Schiele, B. Latent Embeddings for Zero-shot Classification. arXiv preprint arXiv:1603.08895, 2016.
11. Zhang, Z. and Saligrama, V. Zero-shot learning via semantic similarity embedding. In Proceedings of the IEEE International Conference on Computer Vision, pp. 4166-4174, 2015.
12. Ng, A. Y., Jordan, M. I. and Weiss, Y. On spectral clustering: Analysis and an algorithm. Advances in neural information processing systems, 2, pp. 849-856, 2002.
13. B. J. Frey and D. Dueck. Clustering by passing messages between data points. Science, 315:2007, 2007.
14. C. H. Lampert, H. Nickisch, and S. Harmeling. Learning to detect unseen object classes by between class attribute transfer. In IEEE Conference on Computer Vision and Pattern Recognition (CVPR), 2009.
15. B. Romera-Paredes and P. H. Torr. An embarrassingly simple approach to zero-shot learning. Proceedings of The 32nd International Conference on Machine Learning (ICML), 2015.
16. E. Kodirov, T. Xiang, Z.-Y. Fu, and S. Gong. Unsupervised domain adaptation for zero-shot learning. In ICCV, 2015.
17. Z. Akata, S. Reed, D. Walter, H. Lee, and B. Schiele. Evaluation of output embeddings for fine-grained image classification. In IEEE Computer Vision and Pattern Recognition, 2015.
18. S. T. Roweis, L. K. Saul, and G. E. Hinton. Global coordination of local linear models. In Advances in Neural Information Processing Systems, Dec. 3-8, 2001, Vancouver, British Columbia, Canada.

(2) PRINCIPAL ASPECTS

Various embodiments of the invention include three "principal" aspects. The first is a system for recognition of unseen and untrained patterns. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
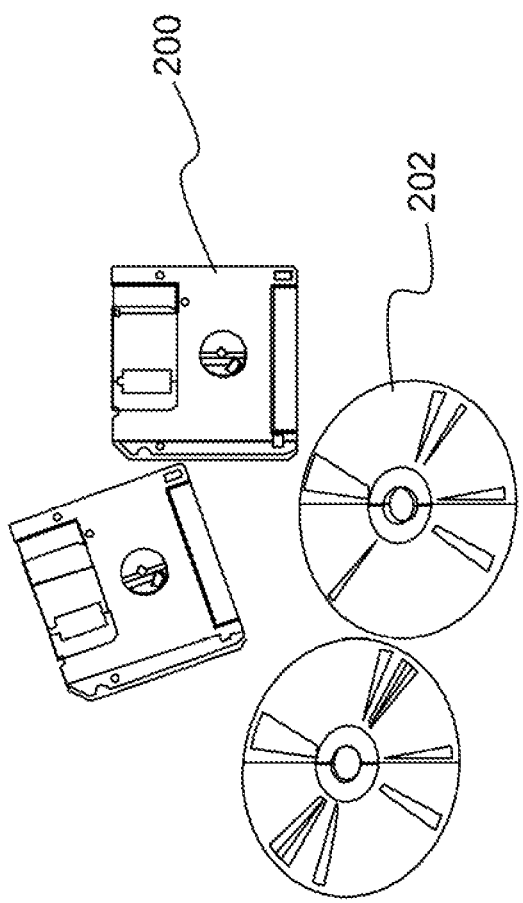
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(4) SPECIFIC DETAILS OF VARIOUS EMBODIMENTS

Described herein is a system to address the problem of zero shot learning (ZSL) using a unique manifold alignment framework based on a localized multi-scale transform on graphs. Zero shot learning enables recognition of unseen or untrained patterns (e.g., objects in an image or video) with no training by utilizing semantic attribute descriptions of the patterns. This is useful for many applications, including enabling autonomous platforms (e.g., self-driving cars navigating new areas, unmanned aerial vehicles exploring unmapped areas) to continue to operate in new situations that they have never before experienced. A unique multi-scale manifold alignment approach is employed (as described in detail below), which is based on the assumption that for a fixed semantic attribute, similar visual features are likely to have similar semantic attributes.

To facilitate the sharing between the visual and semantic representations views, a unique alignment framework between the visual features and the semantic representation is implemented, which is based on Spectral Graph Wavelets (see Literature Reference No. 1 for a description of Spectral Graph Wavelets). Spectral Graph Wavelets (SGW) are basis functions defined on a graph instead of in a continuous coordinate system. SGWs can be used to efficiently represent signals on graphs. SGWs are calculated using a multi-scale graph transform that is localized in vertex and spectral domains. As will be described in detail below, SGW's multi-scale properties provide a natural platform to learn shared information between visual features and semantic representations.

Employing SGW in the system described herein is founded on the following assumption: for a fixed semantic attribute, instances with similar visual features are likely to have similar semantic representations. Instances are samples to be recognized. For example, in the image recognition applications, they could be objects (desks, chairs, cars, people, etc.), activities (sitting, running, jumping, etc.), and scenes (mountain, beach, forest). This fundamental relation between the visual and semantic representations in the zero shot learning problem is implemented directly in the approach according to embodiments of the present disclosure by assigning the semantic attributes as graph signals on the top of a graph based on visual features. Note that the approach described herein works in transductive settings (transferring knowledge between heterogeneous datasets), using all unlabeled data and the classification, and the learning process of the testing data is strictly unsupervised using a manifold assumption.

While the method according to embodiments of the present disclosure is similar to the joint visual-semantic feature spaces alignment methods disclosed in Literature Reference Nos. 2 and 3 it is, based on current knowledge, the first to use the localized multi-scale graph transform for manifold alignment for the problem of the zero shot learning. The alignment is performed in an unsupervised setting by applying regularization directly to the SGW coefficients themselves, which are treated as localized graph signals. An advantage of the framework described herein is that it allows one to align the visual-semantic spaces locally, while taking into account the fine-grain regularity properties of the joint visual-semantic attribute spaces. Moreover, learning the correlation between the visual and semantic attributes is unified into a single process, whereas in most existing zero shot learning methods it is divided into a number of independent steps, such as described in Literature Reference No. 3.

(3.1) Problem Formulation and Model Assumptions

The common problem formulation in the zero-shot learning problem is the following, which is described in Literature Reference No. 3. Assume one is given $c_s$ classes with $n_s$ labeled instances S={$X_s$, $Y_s$} and $c_t$ target classes with $n_t$ unlabeled instances T={$X_t$, $Y_t$}. Each instance of the training and testing data is represented by a d dimensional visual feature $x_s \in X_s$, and $x_t \in X_t$, respectively. $z_s$ and $z_t$ are the class labels vectors of the source and the testing data, and it is assumed that the training and the testing instances are disjoint. $Y_s = R^{n_s \times D}$ and $Y_t = R^{n_t \times D}$ are the source and target semantic attributes datasets, respectively, where each instance in $y_s \in Y_s$, $y_t \in Y_t$ is represented by a D dimensional vector, respectively.

Since for the testing instances the semantic representations $Y_t$ are typically not given, they can be estimated using a projection function from the source dataset (see Literature Reference Nos. 3 and 5). Under this setting, the problem of zero shot learning is to estimate $z_t$ given $X_t$ and $\hat{Y}_t$. The semantic representation which was utilized was the Word2Vec dataset, which was generated using the skip-gram neural network model described in Literature Reference No. 4 trained on English Wikipedia articles, where the textual name of any class was projected to get its word vector representation. Note that this semantic representation was processed without human annotation. While using a semantic representation that is automatically generated may be advantageous for scaling, the performance of most of the state-of-the-art zero shot learning methods degrade significantly on such automated semantic features since they are typically very noisy.

(3.2) Approach

Given the problem formulation, the goal is to estimate the labels of the unseen instances $z_t$. This task can be achieved by learning the relationship between the visual and semantic representation, and then using the semantic representation to estimate the unseen data. In the approach described herein, explicitly assume the constraint that for a fixed attribute coordinate dimension, similar visual features are likely to have similar semantic attributes.

To apply these model assumptions in the framework, a graph is constructed where instances are represented by nodes in a graph, and weighted edges between the nodes are based on the distance between the visual features. The data are assigned to the graph in the form of graph signals $f_r(\ )$ corresponding to the attributes of the instances (i.e., for each dimension r of the semantic attributes, assign $f_r(\ )=\hat{Y}_r$ as a graph signal and process each of the coordinate dimensions of the semantic attributes independently). The goal is aligning the visual and semantic representations by imposing smoothness in each coordinate dimension of the semantic representation.

Graph signal processing tools (described in Literature Reference No. 7) are well-suited to addressing this problem, since in the framework according to embodiments of this disclosure, it is assumed that vertices which are connected on the graph are likely to have similar graph signal values (which are the coordinate dimension of the semantic attributes). Once the graph is constructed, aligning the visual and semantic features spaces is performed by regularization applied directly in the Spectral Graph Wavelets domain (see Literature Reference No. 8 for a description of the SGW domain). In the context of the zero shot learning problem, the advantage of the approach described herein is that it allows one to align the visual and semantic spaces locally while taking into account the global properties of the joint visual-semantic manifold space.

(3.3) Description of the Regularization Algorithm

After the graph is constructed using the assignment of semantic representations as graph signals, the SGW transform is computed using low order polynomials of the Laplacian. The SGW transform ensures that the SGW coefficients are localized in the vertex domain, since for any two points m and n on the graph with $d_G(m,n)=K$, where $d_G$ is the shortest distance path between two points on the graph, there is $L^K(i,j)=0$ if K>J (see Literature Reference No. 1). All scaling coefficients are retained, which correspond to the low frequency information, and Tichonov regularization (see Literature Reference No. 9) is applied to each one of the SGW bands, for each of the coordinates in the semantic representation space. For each manifold dimension and each SGW band at scales $2 \leq s(j) \leq s(J)$, Tikhonov regularization is applied directly to the SGW coefficients $\Psi fr(s)$. Note that one step of a diffusion process on the graph is equivalent to solving Tichonov regularization. Thus, the approach disclosed herein is essentially solving a diffusion process on the graph using graph signals which are the SGW coefficients that are localized both in the visual and semantic spaces. The regularization approach for zero-shot learning using Spectral Graph Wavelets in the pseudo code is shown below in Algorithms 1 and 2.

---

Algorithm 1: Alignment Algorithm

---

Input: The data set labeled instances S = {$X_s$, $Y_s$} and target unseen classes instances T = {$X_t$, $\hat{Y}_t$}, k nearest neighbors on the graph, m - the order of Chebyshev polynomial approximation.
1. Construct an undirected affinity graph W, using cosine similarity as in Literature Reference No. 1 based on the visual features $X_s$, $X_t$, and construct the Laplacian L from W;
2. for r ← 1 to D do
3. Assign the corresponding coordinate values of the semantic representation in dimension r, $\hat{f}_r = (\hat{Y}_t)_r$, to its corresponding vertex on the graph.
4. Take the SGW transform of $\hat{f}_r$ to obtain $\Psi_{\hat{f}_r}$.

-continued

Algorithm 1: Alignment Algorithm

5. Perform regularization to $\tilde{f}_r$ directly in the SGW domain $\Psi_{\tilde{f}_r}$ using the regularization method given in algorithm 2 (described below).
6. Classify the new instances using Spectral Clustering (see Literature Reference No. 12).

Output: The regularized semantic space $\hat{Y}_t$, estimated classes $z_t$.

Algorithm 2: Regularization Algorithm

Input: semantic representation in dimension r, $\tilde{f}_r = (\tilde{Y}_t)_r$, its corresponding SGW coefficients $\Psi_{\tilde{f}_r}$, Laplacian L, $\gamma$ smoothing parameter, J - number of resolutions used for wavelet decompositions.
1. Retain the low pass scaling coefficients. For each resolution $2 \leq j \leq J$, construct the Laplacian $L_{N(K)}$.
2. for j ← 2 to J do
3. Solve Tichonov regularization with respect to the Laplacian $L_{N(K)}$, and SGW coefficients $\Psi_{\tilde{f}_r}(s)$ in scale s(j).
4. Classify the new instances using Spectral Clustering or Affinity Propagation (see Literature Reference No. 13 for a description of Affinity Propagation).

Output: The regularized semantic space $\hat{Y}_t$

(3.4) Experimental Studies

(3.4.1) Experimental Settings

Experimental studies were performed on the AWA (animals with attributes) dataset which is among the most popular and widely used datasets for zero shot learning. AWA consists of 50 classes of animals (30,475 images). It has a source/testing split for zero-shot learning with 10 classes and 6,180 images held out as the testing dataset. To represent the visual features, the deep learning pre-trained GoogleNet features were used (see Literature Reference Nos. 10 and 12). In most of the reported results, competing methods use deep learning features, such as GoogleNet (see Literature Reference No. 10) and vgg-verydeep-19 (see Literature Reference No. 11) to represent the visual features. For the semantic representation, the Word2Vec public dataset was used, where each instance is represented by a 100 dimensional semantic vector. Note that the Word2Vec dataset is constructed automatically from a large unlabeled text corpora (see Literature Reference No. 4), which is in the form of word vectors, without additional manual annotation. Similar to transductive approaches in zero shot learning, such as described in Literature Reference No. 3, studies were begun with an initial estimation of the semantic representation of the testing data which can be done using the DAP (direct-attribute prediction) or IAP (indirect-attribute prediction) schemes (see Literature Reference Nos. 3 and 5). Note that the semantic information for the training data is propagated to the joint embedding space to share information between disjoint classes.

The initial estimation of the semantic representation of the testing set used in the method according to embodiments of the present disclosure can be considered as the initial conditions to solve a partial differential equation (PDE) on the graph whose graph signals are defined by the SGW coefficients which are localized in the joint semantic-visual domain. The described alignment method is employed in a strictly unsupervised setting, such that the graph is constructed using only the visual and semantic testing data, for which no labels were used. J=4 scales were utilized for the SGW transform, and a k=20 nearest neighbor parameter was used for the affinity graph in all experiments.

(3.4.2) Effectiveness of Noise Suppression

The approach described herein was first validated in terms of measuring the effect of graph denoising on the recognition rate for k nearest neighbors from the same class using the AWA dataset. The word2vec representation is typically very noisy which makes the manifold alignment procedure very challenging for current zero shot learning methods where the alignment is used to solve the domain shift problem (see Literature Reference Nos. 2 and 3). For each point in the testing data, the percentage of k nearest neighbors from the same semantic class were reported, and the average accuracy for all the instances in the testing set was reported.

The graph was constructed as follows. First, a k=10 nearest neighbor graph, which is based on the distance between observations in the deep learning feature space, was constructed. Then, k=10 edges were added between each seen (training) data point and its k nearest visual neighbors in the training datasets.

Figure 3:
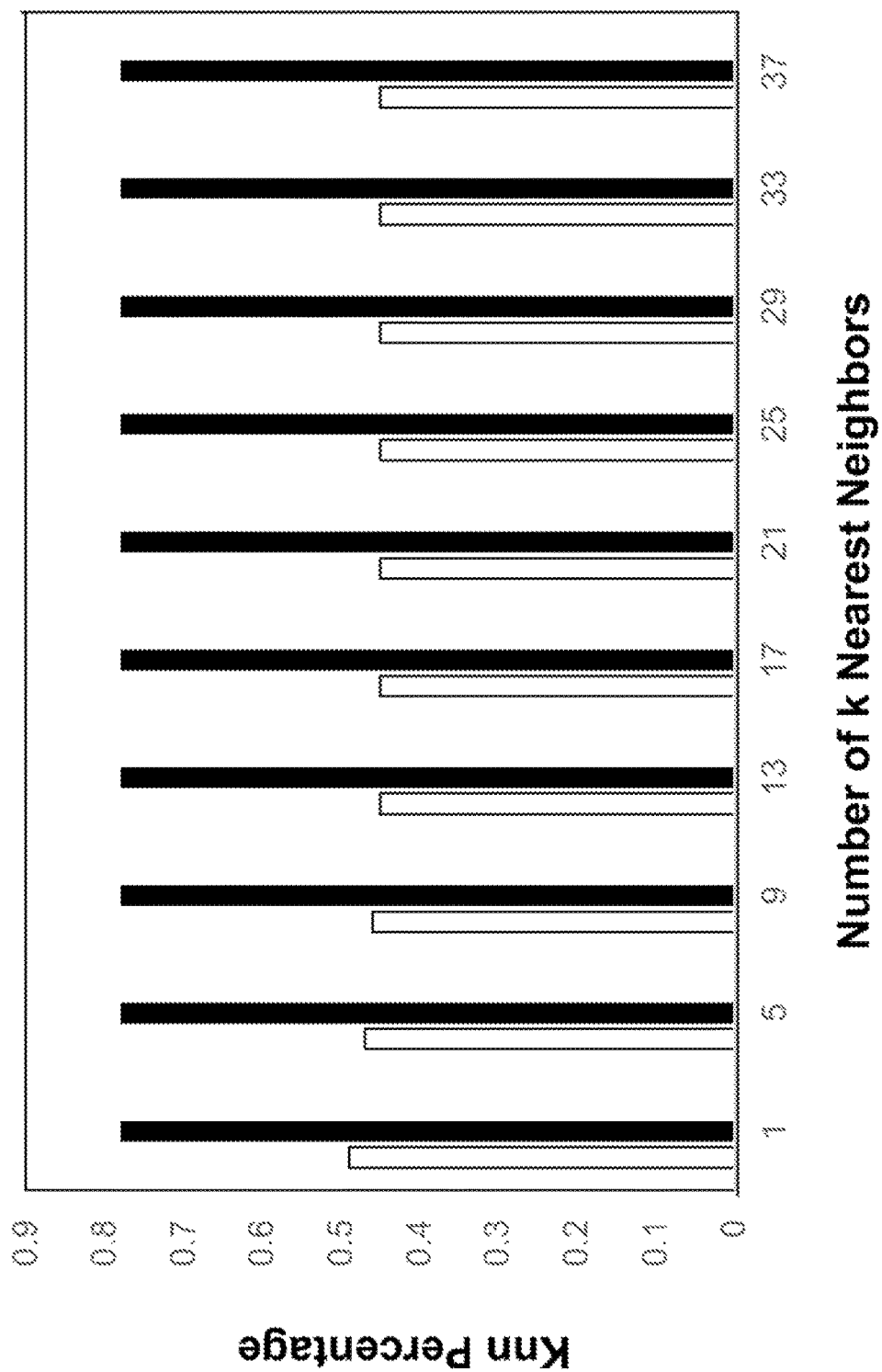
FIG. 3 is a plot illustrating an average percentage of the same-class k nearest neighbors for unseen data, comparing noisy and denoised data according to some embodiments of the present disclosure.

FIG. 3 is a plot showing the average percentage of the correct same-class k nearest neighbors from the same unseen class in the noisy Word2Vec semantic space (represented by unfilled bars), evaluated for k∈{1, 3, . . . , 37}, and after using the regularization process (represented by filled bars) disclosed herein for a wide range of k nearest neighbor parameter. As can be seen, after performing alignment using the approach of the invention, the average percentage of k nearest neighbors from the same unseen class has improved significantly compared to the noisy semantic space, which indicates the effectiveness and robustness of the alignment process. Moreover, due to the multi-resolution properties of Spectral Graph Wavelets, the regularization method performed well for a wide range of k nearest neighbor selections.

Figure 4A:
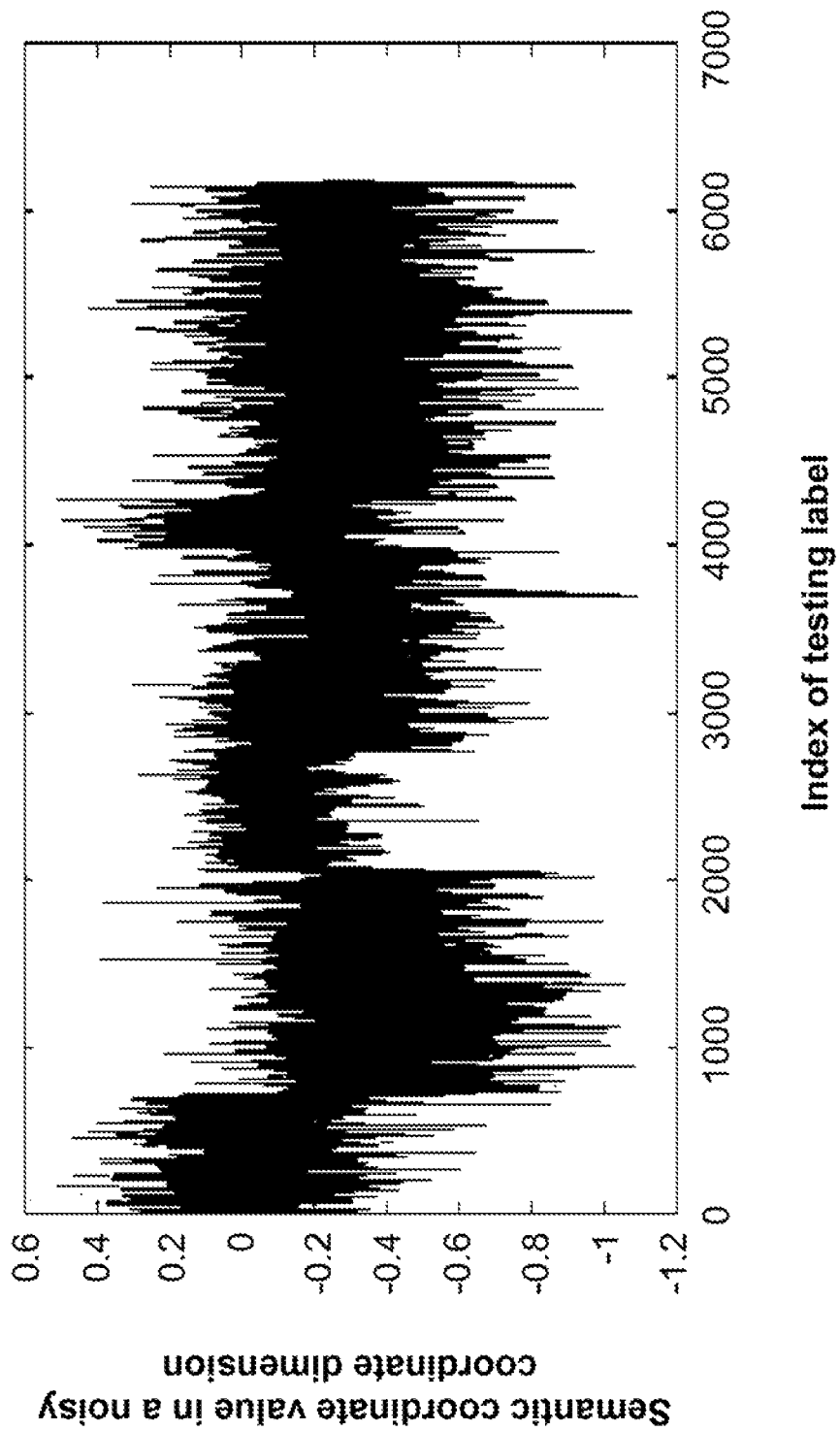
FIG. 4A is a plot illustrating a first noisy semantic dimension according to some embodiments of the present disclosure.
Figure 4B:
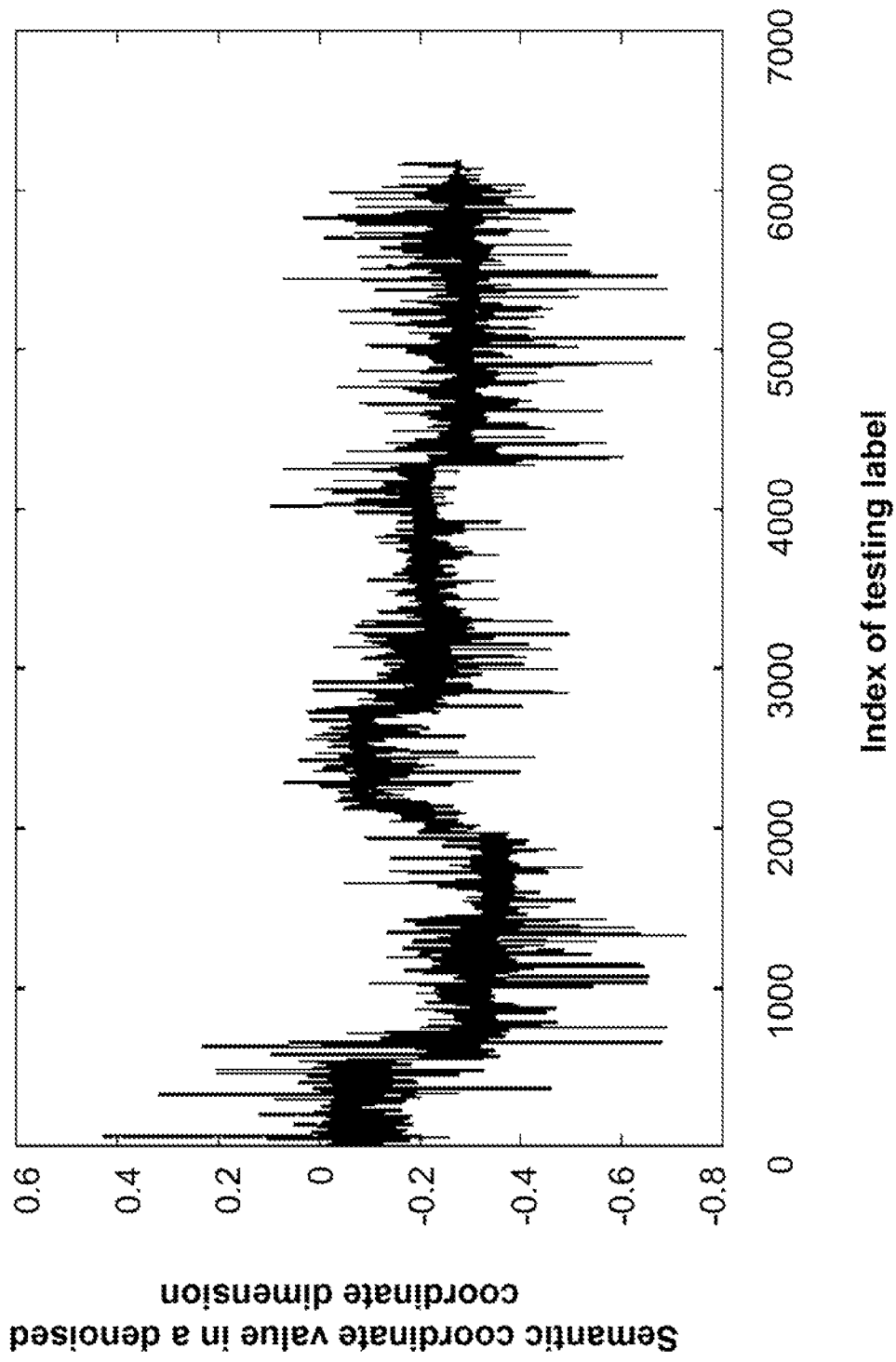
FIG. 4B is a plot illustrating a denoised result of the first noisy semantic dimension according to some embodiments of the present disclosure.
Figure 4C:
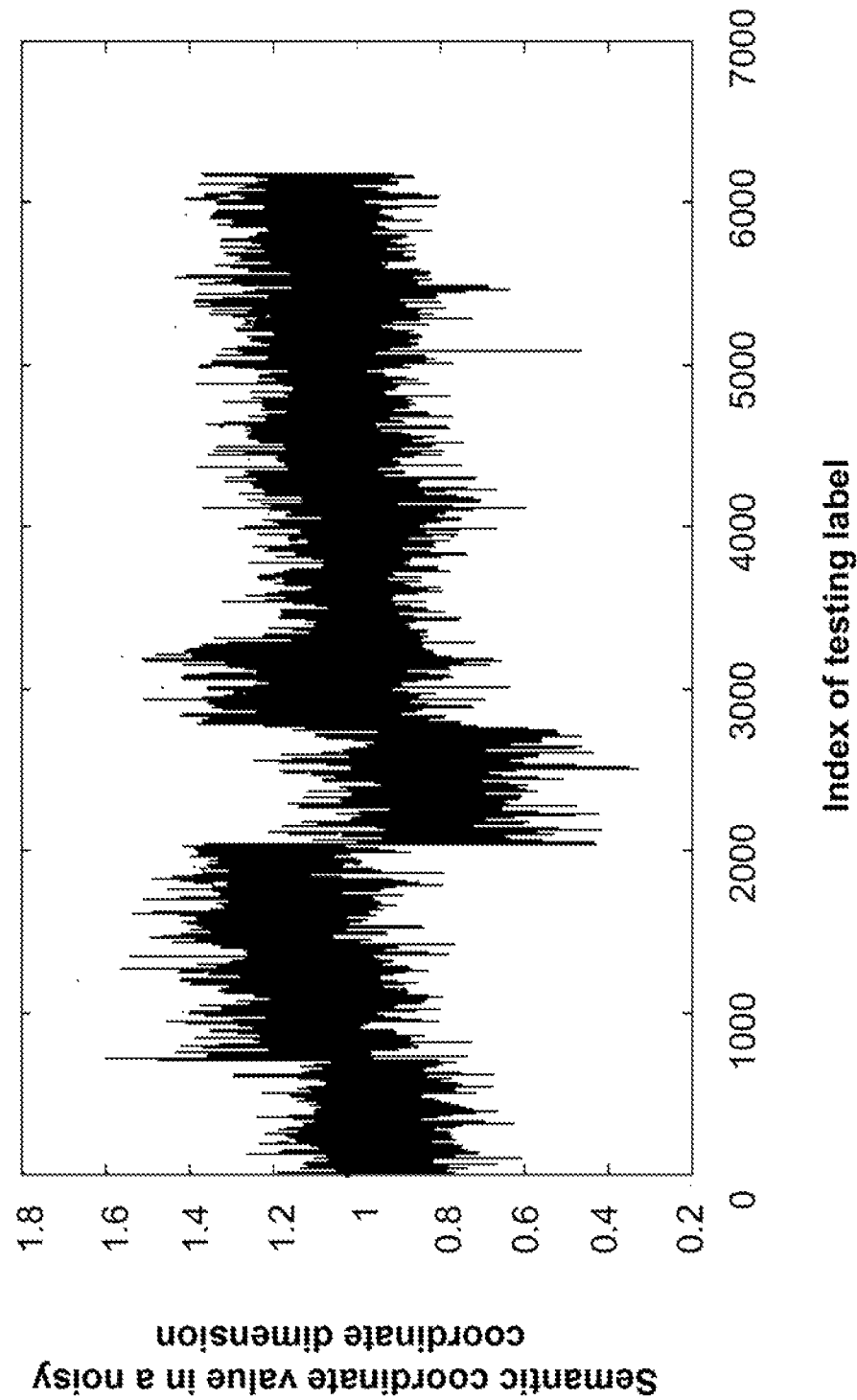
FIG. 4C is a plot illustrating a second noisy semantic dimension according to some embodiments of the present disclosure.
Figure 4D:
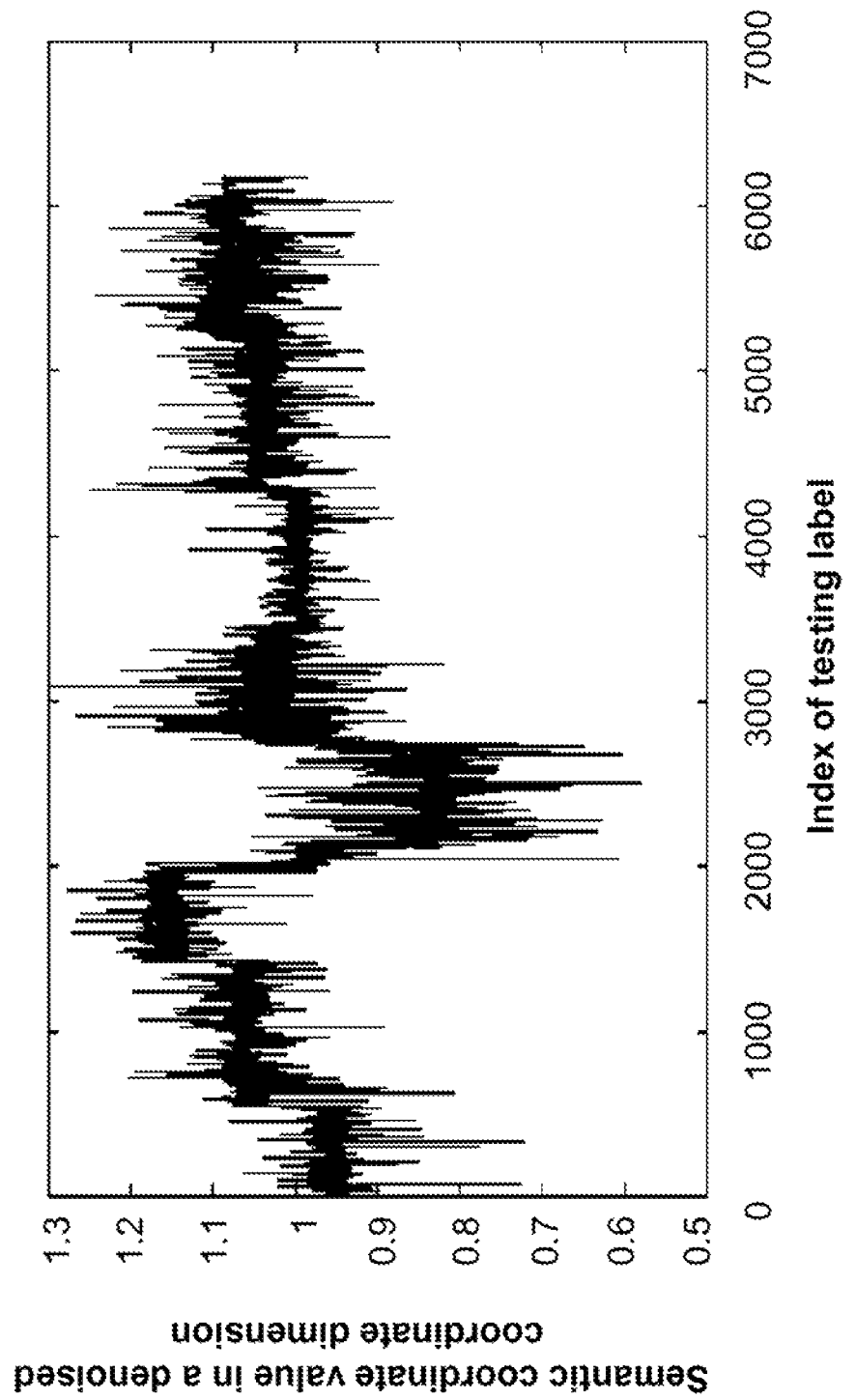
FIG. 4D is a plot illustrating a denoised result of the second noisy semantic dimension according to some embodiments of the present disclosure.

An illustration of the effectiveness the method according to embodiments of this disclosure is shown in FIGS. 4A-4D. Two different coordinate dimensions of the testing noisy semantic representation Word2Vec of the AWA dataset are shown in FIGS. 4A and 4C. The corresponding denoised Word2Vec semantic coordinate dimension is shown in FIGS. 4B and 4D. The results were obtained using the regularization approach disclosed herein for two different coordinate dimensions of the denoised Word2Vec semantic representation, which correspond to the AWA dataset. Note that the 10 testing classes (which are sorted by label number for visualization) have some regularity. It can be seen that after applying the regularization method, the denoised semantic dimension is significantly denoised and shows a piecewise smooth structure. The index of the instances was sorted by their labels for clear visualization.

(3.4.3) Comparison to the State-of-the-Art

Next, the method was tested on the AWA dataset and results were compared to the state-of-the-art. The performance of the method was tested based on classification accuracy of the semantic representation of the testing data and compared to the classification accuracy on the noisy semantic attributes. To evaluate the classification accuracy, Spectral Clustering (see Literature Reference No. 12) was performed on the regularized semantic data and compared to the classification performance on the noisy semantic attributes. FIG. 5 is a table comparing classification accuracy of word2Vec before and after regularization. As can be seen in FIG. 5, after performing regularization using the approach according to embodiments of the present disclosure, the average percentage of k nearest neighbors which belong to the same unseen class improved significantly compared to the noisy semantic space.

Classification accuracy results using the method described herein compared to the state-of-the-art methods in zero shot learning are depicted in the table of FIG. 6. The corresponding semantic representation used by each method is noted in brackets, where "A" corresponds to human annotated attributes, and "W" corresponds to Word2Vec or other automated semantic representation. It can be seen that the method described herein outperforms the state-of-the-art, and is significantly better than all existing methods which use automated text processing, including Transductive Multi-View Zero-Shot Learning (TMZL). Additionally, the method was tested using Affinity Propagation (described in Literature Reference No. 13), which is a popular clustering method based on belief propagation that does not require specifying the number of clusters in the data in advance. Using Affinity Propagation, the method described herein outperformed the state-of-the-art and demonstrated its effectiveness.

Figure 7:
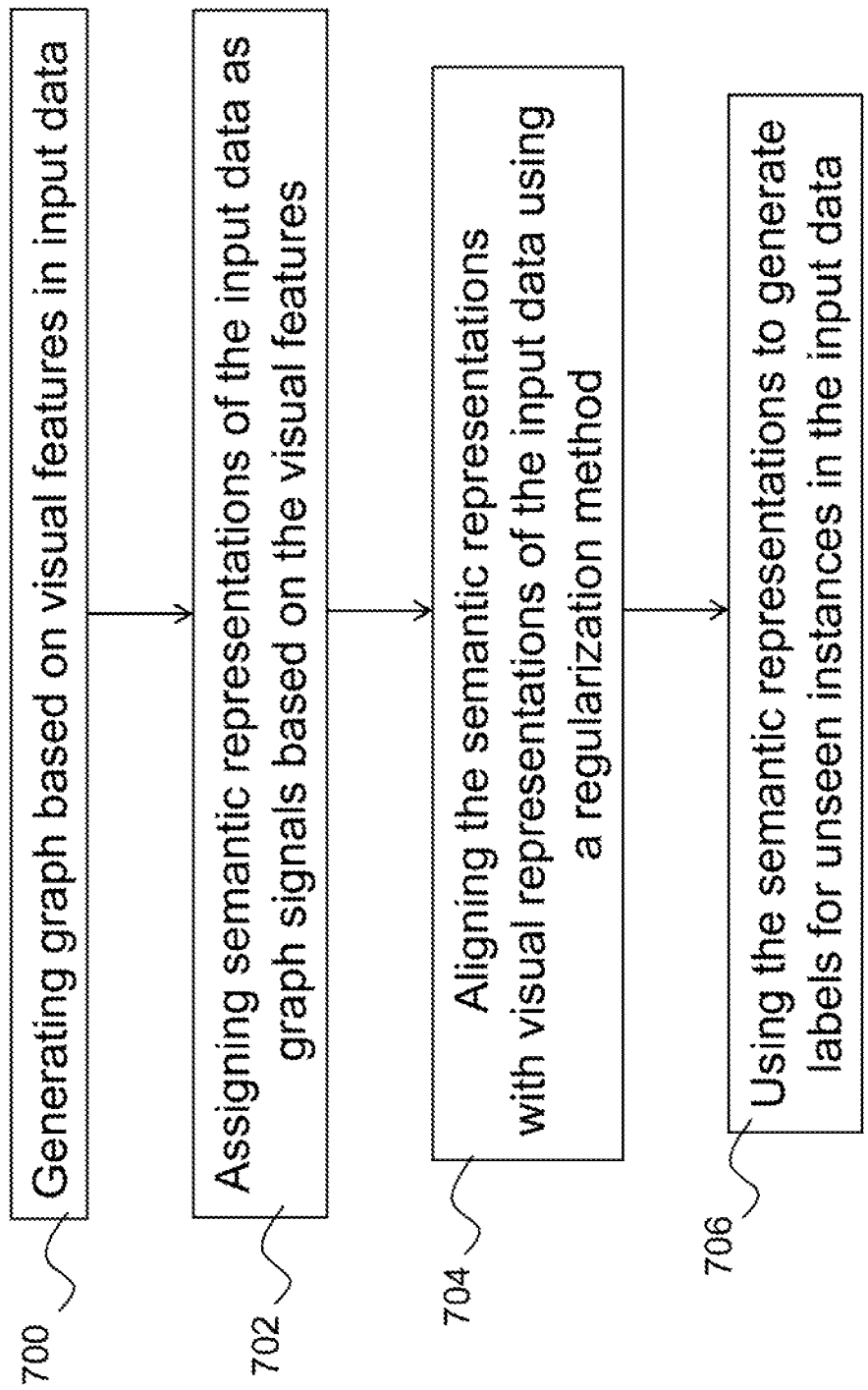
FIG. 7 is a flow diagram illustrating a process for recognition of unseen and untrained patterns according to some embodiments of the present disclosure.

FIG. 7 is a flow diagram depicting the system described herein. As described in detail above, a graph is generated based on visual features in the input data (element 700). Semantic representations of the input data are assigned as graph signals based on the visual features (element 702). The semantic representations are aligned with visual representations of the input data using a regularization method (element 704). The semantic representations are used to estimate labels for unseen instances in the input data (element 706).

In an embodiment, the unseen instances are specific objects, items, or features that the system was not literally trained on that include features that the system was trained on. For example, the unseen instance may be a type of environmental condition that an image recognition system was not trained on, such as a roundabout, a construction area, an offroad path or driveway, a parking lot, or an indoor navigation environment. However, this unseen instance may include features that they system was trained on. In the case of the roundabout, trained features may include a curving roadway, an intersection, a sign with a roundabout symbol, and/or roadway markings. In the case of the parking lot or driveway, trained features may include arrows, painted lines for intersections, or parked cars. In the case of an indoor navigation environment, trained features may include floors, walls, and ceilings, even if the size and shape of a room were not previously trained for. In the case of a construction area, trained features may include cones, hazard or detour signs, orange coloring on surfaces, construction workers and/or vehicles, handheld stop signs, etc.

The system may generate a graph based on the known visual features. Semantic representations may be assigned as graph signals based on the visual features, and the semantic representations may be aligned with visual representations of the input data using a regularization method. The semantic representations may then be used to estimate labels for the unseen instances. For example, the semantic representations of cones, detour signs, orange coloring, and construction workers may be used by the system to label the region as a construction zone. The system may achieve this label without having been trained on a construction zone or only trained on a limited set of construction zones that differ substantially from the current construction zone.

Figure 8:
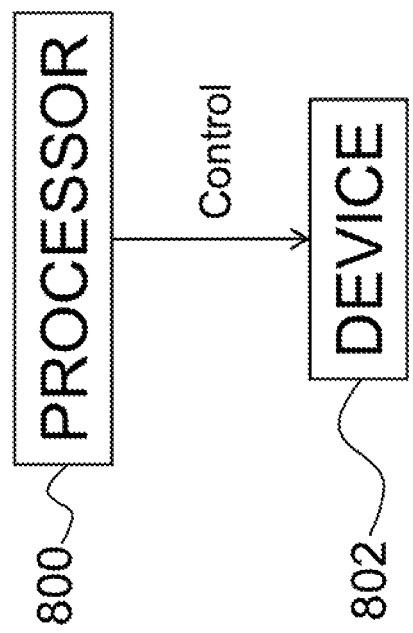
FIG. 8 is a flow diagram illustrating control of devices using the labels for unseen instances according to some embodiments of the present disclosure.

FIG. 8 is a flow diagram illustrating using a processor 800 to control a device 802 using the labels for unseen instances. Non-limiting examples of devices 802 that can be controlled via the processor 800 and the labels for unseen instances include a vehicle or a vehicle component, such as a brake, a steering mechanism, suspension, or safety device (e.g., airbags, seatbelt tensioners, etc.). Further, the vehicle could be an unmanned aerial vehicle (UAV), an autonomous ground vehicle, or a human operated vehicle controlled either by a driver or by a remote operator. As can be appreciated by one skilled in the art, control of other device types is also possible.

The invention provides a key functionality for extension of autonomous vehicle operation to new situations and road conditions. It will enable autonomous vehicles to operate effectively outside carefully mapped and controlled geographical areas and conditions (e.g., new traffic signs, new areas, new road types, or new object classes not observed in training time). For instance, in generating a label for an unseen instance, the system described herein can associate the unseen instance with a new traffic sign and cause the autonomous vehicle to perform a driving operation/maneuver in line with driving parameters in accordance with the new traffic sign. For example, if the sign is a stop sign, the system may cause the autonomous vehicle to apply a functional response, such as a braking operation, to stop the vehicle. Other appropriate responses may include one or more of a steering operation, a throttle operation to increase speed or to decrease speed, or a decision to maintain course and speed without change. The responses may be appropriate for avoiding a collision, improving travel speed, or improving efficiency.

Further, the system described herein improves automated intelligence, surveillance, reconnaissance (ISR) software for unmanned aerial vehicle (UAV) ground stations that can identify new objects and behaviors, such as uncommon vehicles like earthmovers or uncommon vehicle formation/patterns, only using human generated verbal descriptions. They are never observed in sensor data and trained to classify. However, by matching their semantic attributes {camouflage, armored, weapon, tracks, wheels} learned from the known object and behavior data, the system results in the correctly classified object or behavior labels. This will enable rapid actions taken in time critical missions.

In addition, it could enable autonomous UAV flight and exploration in new areas which may contain new objects and behaviors, reduce training time for those new examples (e.g., several hours to days to extract features from collected data and train a classifier that can classify new objects and behaviors), and reduce manpower required for UAV operations. Zero shot learning can also be applicable to mobile threat detection detection (by detecting novel security threats), multimodal activity recognition (by classifying novel activity patterns), and many other learning applications.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while method steps have been recited in an order, the method steps may occur in any desired order and fall within the scope of the present invention.

What is claimed is:

1. A system for recognition of unseen and untrained patterns, the system comprising:
   one or more processors and a non-transitory computer-readable medium having executable instructions encoded thereon such that when executed, the one or more processors perform operations of:
      generating a graph based on a set of visual features from input data, the input data comprising labeled instances and unseen instances that are unlabeled;
      assigning semantic representations of the input data as graph signals based on the set of visual features, wherein each semantic representation comprises coordinate dimensions;
      aligning the semantic representations with visual representations of the input data using a regularization method applied directly in a spectral graph wavelets (SGW) domain;
      generating labels for the unseen instances using the semantic representations; and
      controlling a device based on the labels for the unseen instances.

2. The system as set forth in claim 1, wherein the one or more processors further perform operations of:
   generating the graph such that labeled instances and unseen instances are represented by nodes in the graph, and weighted edges between the nodes are based on distances between visual features;
   assigning the input data to the graph in the form of graph signals corresponding to attributes of the labeled instances and unseen instances; and
   aligning the visual and semantic representations by imposing smoothness in each coordinate dimension of the semantic representation.

3. The system as set forth in claim 1, wherein for labeled instances $S=\{X_s, Y_s\}$ and target classes with unseen instances $T=\{X_t, \hat{Y}_t\}$, k, the one or more processors further perform operations of:
   generating the graph based on the visual features $X_s, X_t$;
   generating a Laplacian L from the graph;
   assigning a set of corresponding coordinate values of the semantic representation in a dimension r, $\tilde{f}_r=(\tilde{Y}_t)_r$, to a corresponding vertex on the graph;
   computing the SGW transform of $\tilde{f}_r$ to obtain a SGW domain $\Psi_{\tilde{f}_r}$; and
   applying a regularization method to $\tilde{f}_r$ directly in the SGW domain $\Psi_{\tilde{f}_r}$ using the regularization method.

4. The system as set forth in claim 1, wherein the regularization method receives as
   input the semantic representation in the dimension r, $\tilde{f}_r=(\tilde{Y}_t)_r$, its corresponding SGW coefficients $\Psi_{\tilde{f}_r}$, the Laplacian L, a smoothing parameter γ, and a number of resolutions used for wavelet decompositions J, and wherein the one or more processors further perform operations of:
      for each resolution 2≤j≤J, generating a Laplacian $L_{N(K)}$;
      determining a Tichonov regularization with respect to the Laplacian $L_{N(K)}$ and SGW coefficients $\Psi_{\tilde{f}_r}(s)$;
      classifying the unseen instances using spectral clustering; and
      outputting a regularized semantic space $\hat{Y}_t$ and estimated target classes.

5. The system as set forth in claim 1, wherein the unseen instances represent new environmental conditions for an autonomous vehicle to navigate, wherein estimating labels for the unseen instances enables the autonomous vehicle to operate effectively outside known environmental conditions.

6. The system as set forth in claim 1, wherein the unseen instances represent new areas for an autonomous vehicle to navigate, wherein estimating labels for the unseen instances enables the autonomous vehicle to operate effectively outside known areas.

7. The system as set forth in claim 1, wherein an unmanned aerial vehicle (UAV) uses the generated labels for the unseen instances to identify objects and/or behaviors during UAV operations.

8. The system as set forth in claim 1, wherein generating the labels includes associating at least one unseen instance with a new traffic sign and causing an associated vehicle to perform a driving operation according to the new traffic sign.

9. The system as set forth in claim 1, wherein the device is a vehicle component, and controlling the device results in a vehicle maneuver.

10. A computer implemented method for recognition of unseen and untrained patterns, the method comprising an act of:
    causing one or more processors to execute instructions encoded on a non-transitory computer-readable medium, such that upon execution, the one or more processors perform operations of:
       generating a graph based on a set of visual features from input data, the input data comprising labeled instances and unseen instances that are unlabeled;
       assigning semantic representations of the input data as graph signals based on the set of visual features, wherein each semantic representation comprises coordinate dimensions;
       aligning the semantic representations with visual representations of the input data using a regularization method applied directly in a spectral graph wavelets (SGW) domain;
       generating labels for the unseen instances using the semantic representations; and
       controlling a device based on the labels for the unseen instances.

11. The method as set forth in claim 10, wherein the one or more processors further perform operations of:
    generating the graph such that labeled instances and unseen instances are represented by nodes in the graph, and weighted edges between the nodes are based on distances between visual features;

assigning the input data to the graph in the form of graph signals corresponding to attributes of the labeled instances and unseen instances; and aligning the visual and semantic representations by imposing smoothness in each coordinate dimension of the semantic representation.

12. The method as set forth in claim 10, wherein for labeled instances $S=\{X_s, Y_s\}$ and target classes with unseen instances $T=\{X_t, \tilde{Y}_t\}$, k, the one or more processors further perform operations of:

generating the graph based on the visual features $X_s$, $X_t$;

generating a Laplacian L from the graph;

assigning a set of corresponding coordinate values of the semantic representation in a dimension r, $\tilde{f}_r=(\tilde{Y}_t)_r$, to a corresponding vertex on the graph;

computing the SGW transform of $\tilde{f}_r$ to obtain a SGW domain $\Psi_{\tilde{f}_r}$; and applying a regularization method to $\tilde{f}_r$ directly in the SGW domain $\Psi_{\tilde{f}_r}$ using the regularization method.

13. The method as set forth in claim 12, wherein the regularization method receives as input the semantic representation in the dimension r, $\tilde{f}_r=(\tilde{Y}_t)_r$, its corresponding SGW coefficients $\hat{\Psi}_{\tilde{f}_r}$, the Laplacian L, a smoothing parameter γ, and a number of resolutions used for wavelet decompositions J, and wherein the one or more processors further perform operations of:

for each resolution 2≤j≤J, generating a Laplacian $L_{N(K)}$;

determining a Tichonov regularization with respect to the Laplacian $L_{N(K)}$ and SGW coefficients $\Psi_{\tilde{f}_r}(s)$;

classifying the unseen instances using spectral clustering; and outputting a regularized semantic space $\hat{Y}_t$ and estimated target classes.

14. The method as set forth in claim 10, wherein the unseen instances represent new environmental conditions for an autonomous vehicle to navigate, wherein estimating labels for the unseen instances enables the autonomous vehicle to operate effectively outside known environmental conditions.

15. The method as set forth in claim 10, wherein the unseen instances represent new areas for an autonomous vehicle to navigate, wherein estimating labels for the unseen instances enables the autonomous vehicle to operate effectively outside known areas.

16. The method as set forth in claim 10, wherein an unmanned aerial vehicle (UAV) uses the generated labels for the unseen instances to identify at least one of objects and behaviors during UAV operations.

17. A computer program product for recognition of unseen and untrained patterns, the computer program product comprising:

computer-readable instructions stored on a non-transitory computer-readable medium that are executable by a computer having one or more processors for causing the processor to perform operations of:

generating a graph based on a set of visual features from input data, the input data comprising labeled instances and unseen instances that are unlabeled;

assigning semantic representations of the input data as graph signals based on the set of visual features, wherein each semantic representation comprises coordinate dimensions;

aligning the semantic representations with visual representations of the input data using a regularization method applied directly in a spectral graph wavelets (SGW) domain;

generating labels for the unseen instances using the semantic representations; and controlling a device based on the labels for the unseen instances.

18. The computer program product as set forth in claim 17, further comprising instructions for causing the one or more processors to further perform operations of:

generating the graph such that labeled instances and unseen instances are represented by nodes in the graph, and weighted edges between the nodes are based on distances between visual features;

assigning the input data to the graph in the form of graph signals corresponding to attributes of the labeled instances and unseen instances; and aligning the visual and semantic representations by imposing smoothness in each coordinate dimension of the semantic representation.

19. The computer program product as set forth in claim 17, wherein for labeled instances $S=\{X_s, Y_s\}$ and target classes with unseen instances $T=\{X_t, \tilde{Y}_t\}$, k, the one or more processors further perform operations of:

generating the graph based on the visual features $X_s$, $X_t$;

generating a Laplacian L from the graph;

assigning a set of corresponding coordinate values of the semantic representation in a dimension r, $\tilde{f}_r=(\tilde{Y}_t)_r$, to a corresponding vertex on the graph;

computing the SGW transform of $\tilde{f}_r$ to obtain a SGW domain $\Psi_{\tilde{f}_r}$; and applying a regularization method to $\tilde{f}_r$ directly in the SGW domain $\Psi_{\tilde{f}_r}$ using the regularization method.

20. The computer program product as set forth in claim 19, wherein the regularization method receives as input the semantic representation in the dimension r, $\tilde{f}_r=(\tilde{Y}_t)_r$, its corresponding SGW coefficients $\hat{\Psi}_{\tilde{f}_r}$, the Laplacian L, a smoothing parameter γ, and a number of resolutions used for wavelet decompositions J, and wherein the computer program product further comprises instructions for causing the one or more processors to further perform operations of:

for each resolution 2≤j≤J, generating a Laplacian $L_{N(K)}$;

determining a Tichonov regularization with respect to the Laplacian $L_{N(K)}$ and SGW coefficients $\Psi_{\tilde{f}_r}(s)$;

classifying the unseen instances using spectral clustering; and outputting a regularized semantic space $\hat{Y}_t$ and estimated target classes.

21. The computer program product as set forth in claim 17, wherein the unseen instances represent new environmental conditions for an autonomous vehicle to navigate, wherein estimating labels for the unseen instances enables the autonomous vehicle to operate effectively outside known environmental conditions.

22. The computer program product as set forth in claim 17, wherein the unseen instances represent new areas for an autonomous vehicle to navigate, wherein estimating labels for the unseen instances enables the autonomous vehicle to operate effectively outside known areas.

23. The computer program product as set forth in claim 17, wherein an unmanned aerial vehicle (UAV) uses the generated labels for the unseen instances to identify at least one of objects and behaviors during UAV operations.

* * * * *